US012713119B2

(12) United States Patent
Moon

(10) Patent No.: US 12,713,119 B2
(45) Date of Patent: Aug. 18, 2026

(54) CAMERA MODULE

(71) Applicant: LG INNOTEK CO., LTD., Seoul (KR)

(72) Inventor: Sung Min Moon, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 743 days.

(21) Appl. No.: 18/043,820

(22) PCT Filed: Sep. 2, 2021

(86) PCT No.: PCT/KR2021/011829

§ 371 (c)(1),
(2) Date: Dec. 12, 2023

(87) PCT Pub. No.: WO2022/050711

PCT Pub. Date: Mar. 10, 2022

(65) Prior Publication Data

US 2024/0121491 A1 Apr. 11, 2024

(30) Foreign Application Priority Data

Sep. 2, 2020 (KR) ........................ 10-2020-0111476

(51) Int. Cl.
*H04N 23/55* (2023.01)
*G02B 7/02* (2021.01)
*G02B 13/00* (2006.01)

(52) U.S. Cl.
CPC ............. *H04N 23/55* (2023.01); *G02B 7/021* (2013.01); *G02B 13/003* (2013.01)

(58) Field of Classification Search
CPC ........ H04N 23/55; H04N 23/51; H04N 23/57; G02B 7/021; G02B 13/003; G03B 17/12
See application file for complete search history.

(56) References Cited

U.S. PATENT DOCUMENTS 10,684,444 B2 6/2020 Lee et al.
11,333,845 B2 * 5/2022 Yedid .................... G02B 7/021
(Continued)

FOREIGN PATENT DOCUMENTS

CN 105717602 A 6/2016
CN 108028882 A 5/2018
(Continued)

OTHER PUBLICATIONS

Office Action dated Aug. 20, 2025 in Chinese Application No. 202180054282.1.
(Continued)

*Primary Examiner* — Tuyen Tra
(74) *Attorney, Agent, or Firm* — SALIWANCHIK, LLOYD & EISENSCHENK

(57) ABSTRACT

A camera module disclosed to an embodiment includes a lens barrel; and a lens spacer disposed in the lens barrel. The lens spacer includes an opening portion penetrating an upper surface and a lower surface thereof, and a shape of an upper region of the opening portion is different from a shape of a lower region of the opening portion. The upper region of the opening portion comprises a first inner periphery having a curved shape, a second inner periphery having a curved shape and facing the first inner periphery in a first direction, and a third inner periphery connecting one-side ends of the first and second inner peripheries and having a straight-line shape, and a fourth inner periphery connecting the other-side ends of the first and second inner peripheries, which are opposite to the one-side ends thereof, having a straight-line shape, and facing the third inner periphery in a second direction. The lower region of the opening portion may have a circular shape.

20 Claims, 6 Drawing Sheets

(56) References Cited

U.S. PATENT DOCUMENTS

| | | | | |
|---|---|---|---|---|
| 11,733,486 | B2 | 8/2023 | Yoo et al. | |
| 11,914,218 | B2 | 2/2024 | Lee et al. | |
| 12,124,004 | B2 | 10/2024 | Yoo et al. | |
| 2003/0137595 | A1* | 7/2003 | Takachi ............... | G02B 13/001 348/340 |
| 2015/0244905 | A1 | 8/2015 | Morishima et al. | |
| 2015/0253532 | A1 | 9/2015 | Lin | |
| 2016/0231526 | A1 | 8/2016 | Lin et al. | |
| 2019/0179098 | A1 | 6/2019 | Yang et al. | |
| 2020/0174215 | A1 | 6/2020 | Nakamura | |
| 2020/0409020 | A1 | 12/2020 | Yedid et al. | |
| 2024/0151931 | A1 | 5/2024 | Lee et al. | |
| 2025/0013008 | A1 | 1/2025 | Yoo et al. | |

FOREIGN PATENT DOCUMENTS

| | | | |
|---|---|---|---|
| CN | 110892707 | A | 3/2020 |
| CN | 211206929 | U | 8/2020 |
| KR | 10-1253464 | B1 | 4/2013 |
| KR | 10-1436529 | B1 | 9/2014 |
| KR | 10-2020-0101409 | A | 8/2020 |
| WO | 2019/017511 | A1 | 1/2019 |
| WO | 2019/167001 | A1 | 9/2019 |

OTHER PUBLICATIONS

Supplementary European Search Report dated Mar. 5, 2024 in European Application No. 21864670.1.

International Search Report dated Dec. 27, 2021 in International Application No. PCT/KR2021/011829.

* cited by examiner

CAMERA MODULE

TECHNICAL FIELD

An embodiment relates to a camera module applicable to various lenses.

BACKGROUND ART

The camera module captures an object and stores it as an image or video, and is installed in various applications. In particular, the camera module is produced in a very small size and is applied to not only portable devices such as smartphones, tablet PCs, and laptops, but also drones and vehicles to provide various functions. For example, the optical system of the camera module may include an imaging lens for forming an image, and an image sensor for converting the formed image into an electrical signal. In this case, the camera module may perform an autofocus (AF) function of aligning the focal lengths of the lenses by automatically adjusting the distance between the image sensor and the imaging lens, and may perform a zooning function of zooming up or zooning out by increasing or decreasing the magnification of a remote object through a zoom lens. In addition, the camera module employs an image stabilization (IS) technology to correct or prevent image stabilization due to an unstable fixing device or a camera movement caused by a user's movement.

The camera module may include a lens barrel including a plurality of imaging lenses to implement high resolution. In addition, at least one spacer may be disposed between the plurality of imaging lenses to maintain a distance between the lenses. The spacer may be located between the plurality of imaging lenses in a region corresponding to a ineffective region of the imaging lens irrelevant to optical characteristics incident thereon. The spacer is generally manufactured through mechanical processing such as grinding and cutting, press processing, injection molding processing, and the like, and may have an opening portion in a region corresponding to an effective region of an imaging lens. In this case, upper and lower portions of the opening portion have shapes corresponding to each other, and imaging lenses respectively disposed on the upper and lower portions of the opening portion have shapes corresponding to the upper and lower portions of the opening portion. As a result, the size of the effective diameter of the imaging lens decreases, which may cause light loss and deteriorate optical characteristics. As upper and lower portions of the opening portion have shapes corresponding to each other, there is a problem in that the degree of freedom in the shape of imaging lenses respectively disposed on the upper and lower portions of the spacer is reduced. Accordingly, a new lens spacer and a camera module including the lens spacer capable of solving the above problems are required.

DISCLOSURE

Technical Problem

An embodiment provides a camera module in which lenses of different shapes may be disposed on upper and lower portions of a lens spacer. An embodiment provides a camera module in which upper and lower shapes of an opening portion of the lens spacers are different. An embodiment provides a camera module capable of reducing thickness and having improved optical characteristics.

Technical Solution

A camera module according to an embodiment of the invention comprises a lens barrel and a lens spacer disposed in the lens barrel, the lens spacer comprises an opening portion penetrating an upper surface and a lower surface thereof, a shape of an upper region of the opening portion is different from a shape of a lower region of the opening portion, the upper region of the opening portion connects a first inner periphery having a curved shape, a second inner periphery having a curved shape and facing the first inner periphery in a first direction, and a third inner periphery connecting one-side ends of the first and second inner peripheries and having a straight-line shape, and a fourth inner periphery connecting the other-side ends of the first and second inner peripheries, which are opposite to the one-side ends thereof, having a straight-line shape, and facing the third inner periphery in a second direction, and the lower region of the opening portion may have a circular shape.

According to an embodiment of the invention, the upper and lower regions of the opening portion may satisfy Equation 1 below:

$$0.2<(X1/Y1)-(X2/Y2)<1.9 \quad \text{[Equation 1]}$$

(In Equation 1, X1 means a maximum length of the upper region of the opening portion in the first direction, and Y1 means a maximum length of the upper region of the opening portion in the second direction perpendicular to the first direction. In addition, X2 means a maximum length of the lower region of the opening portion in the first direction, and Y2 means a maximum length of the lower region of the opening portion in the second direction).

According to an embodiment of the invention, at least one inner side surface exposed by the opening portion includes, wherein the inner side surface includes a first inner side surface, a second inner side surface facing the first inner side surface in the first direction, and a third inner side surface disposed between the first and second inner side surfaces, and a fourth inner side surface disposed between the first and second inner side surfaces and facing in the second direction perpendicular to the first direction. The first inner side surface may have a first inclination angle with respect to the lower surface, the second inner side surface may have a second inclination angle with respect to the lower surface, and the first inclination angle may be equal to the second inclination angle. The third inner side surface may have a third inclination angle with respect to the lower surface, the fourth inner side surface may have a fourth inclination angle with respect to the lower surface, and the third inclination angle may be equal to the fourth inclination angle. The third and fourth inclination angles may be smaller than the first and second inclination angles.

A camera module according to an embodiment of the invention includes a first lens and a second lens sequentially disposed along an optical axis from an object side to an image side, and a lens spacer disposed between the first and second lenses, the first and second lenses may have different shapes, the lens spacer may include an opening portion through which upper and lower surfaces pass, and a shape of an upper region of the opening portion may be different from a shape of a lower region of the opening portion.

According to an embodiment of the invention, the first lens may have a D-cut shape, and the second lens may have a circular shape. The upper region of the opening portion may have a shape corresponding to a that of the first lens, and the lower region of the opening portion may have a shape corresponding to that of the second lens.

Advantageous Effects

A lens spacer of a camera module according to an embodiment includes an opening portion, and an upper region and a lower region of the opening portion may have different shapes. Accordingly, the lens spacer may maintain a set distance between the two lenses between lenses having different shapes. The camera module may include at least one non-circular lens and may have a thinner thickness than a camera module including only a circular lens. Accordingly, the camera module may be provided slim.

In the camera module, the number of non-circular lenses may be reduced as upper and lower regions of the opening portion formed in the lens spacer have different shapes. In detail, the camera module may minimize the number of lens surfaces having a non-circular shape and minimize light loss caused by the non-circular lens surfaces. Accordingly, the camera module according to the embodiment may have improved optical characteristics.

DESCRIPTION OF DRAWINGS

FIG. 4 is a plan view of a lens of a camera module according to an embodiment.

BEST MODE

Figure 1:
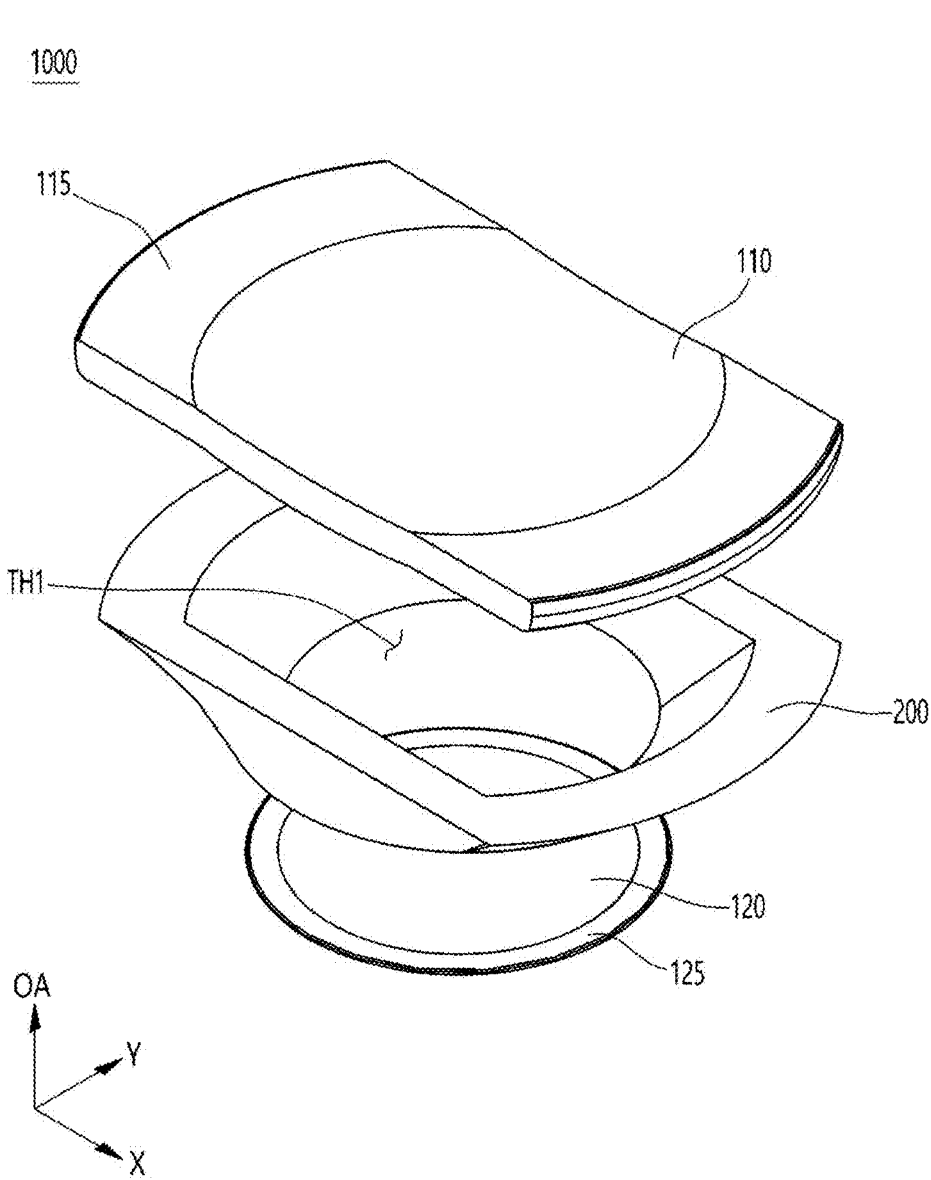
FIG. 1 is a perspective view of a camera module according to an embodiment.

Hereinafter, preferred embodiments of the invention will be described in detail with reference to the accompanying drawings. A technical spirit of the invention is not limited to some embodiments to be described, and may be implemented in various other forms, and one or more of the components may be selectively combined and substituted for use within the scope of the technical spirit of the invention. The terms (including technical and scientific terms) used in the embodiments of the invention, unless specifically defined and described explicitly, may be interpreted in a meaning that may be generally understood by those having ordinary skill in the art to which the invention pertains, and terms that are commonly used such as terms defined in a dictionary should be able to interpret their meanings in consideration of the contextual meaning of the relevant technology. Further, the terms used in the embodiments of the invention are for explaining the embodiments and are not intended to limit the invention. In this specification, the singular forms also may include plural forms unless otherwise specifically stated in a phrase, and in the case in which at least one (or one or more) of A and (and) B, C is stated, it may include one or more of all combinations that may be combined with A, B, and C.

In describing the components of the embodiments of the invention, terms such as first, second, A, B, (a), and (b) may be used. Such terms are only for distinguishing the component from other component, and may not be determined by the term by the nature, sequence or procedure etc. of the corresponding constituent element. And when it is described that a component is "connected", "coupled" or "joined" to another component, the description may include not only being directly connected, coupled or joined to the other component but also being "connected", "coupled" or "joined" by another component between the component and the other component. In addition, in the case of being described as being formed or disposed "above (on)" or "below (under)" of each component, the description includes not only when two components are in direct contact with each other, but also when one or more other components are formed or disposed between the two components. In addition, when expressed as "above (on)" or "below (under)", it may refer to a downward direction as well as an upward direction with respect to one element.

The convex surface of the lens may mean that the lens surface of the region corresponding to the optical axis has a convex shape, and the concave lens surface means that the lens surface of the region corresponding to the optical axis has a concave shape. In addition, "object-side surface" may mean the surface of the lens facing the object side with respect to the optical axis, and "image-side surface" may mean the surface of the lens toward the imaging surface with respect to the optical axis. In addition, the vertical direction may mean a direction perpendicular to the optical axis, and the end of the lens or the lens surface may mean the end of the effective region of the lens through which the incident light passes.

Figure 2:
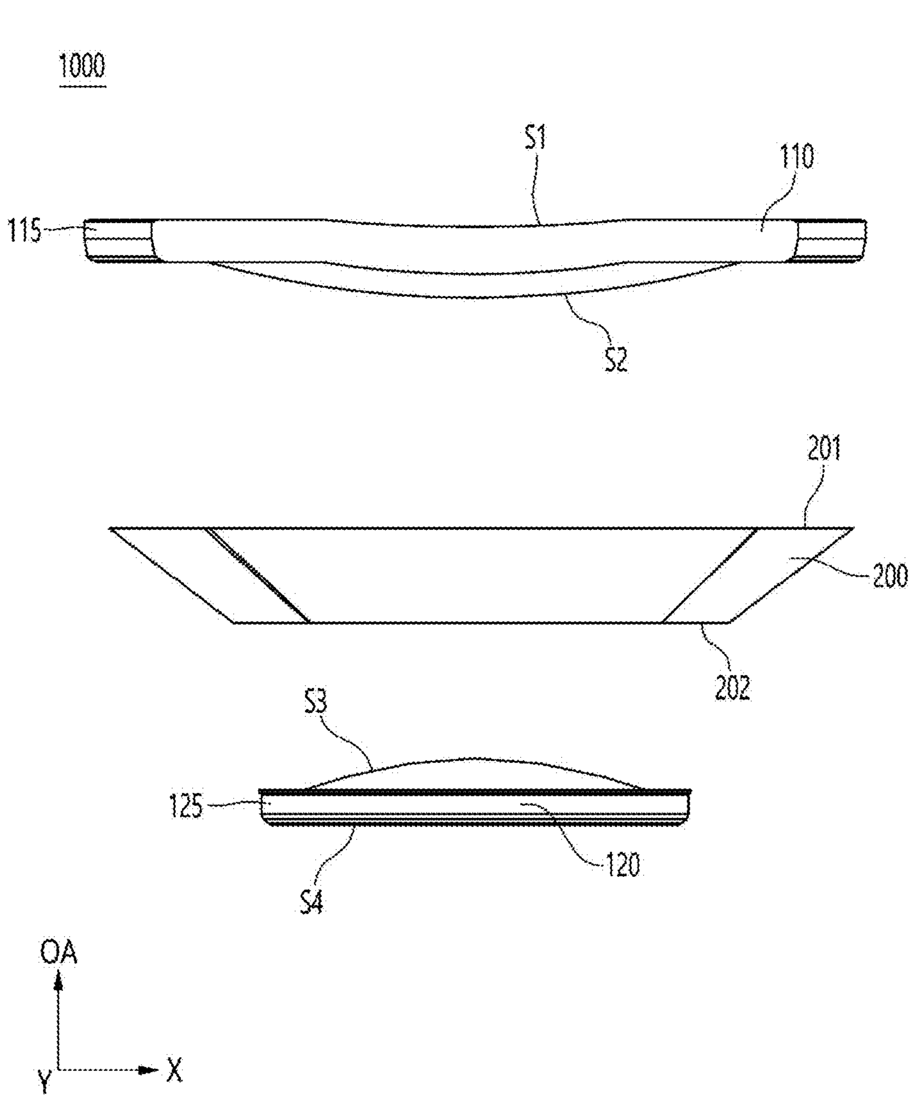
FIGS. 2 and 3 are side views of a camera module according to an embodiment.
Figure 3:
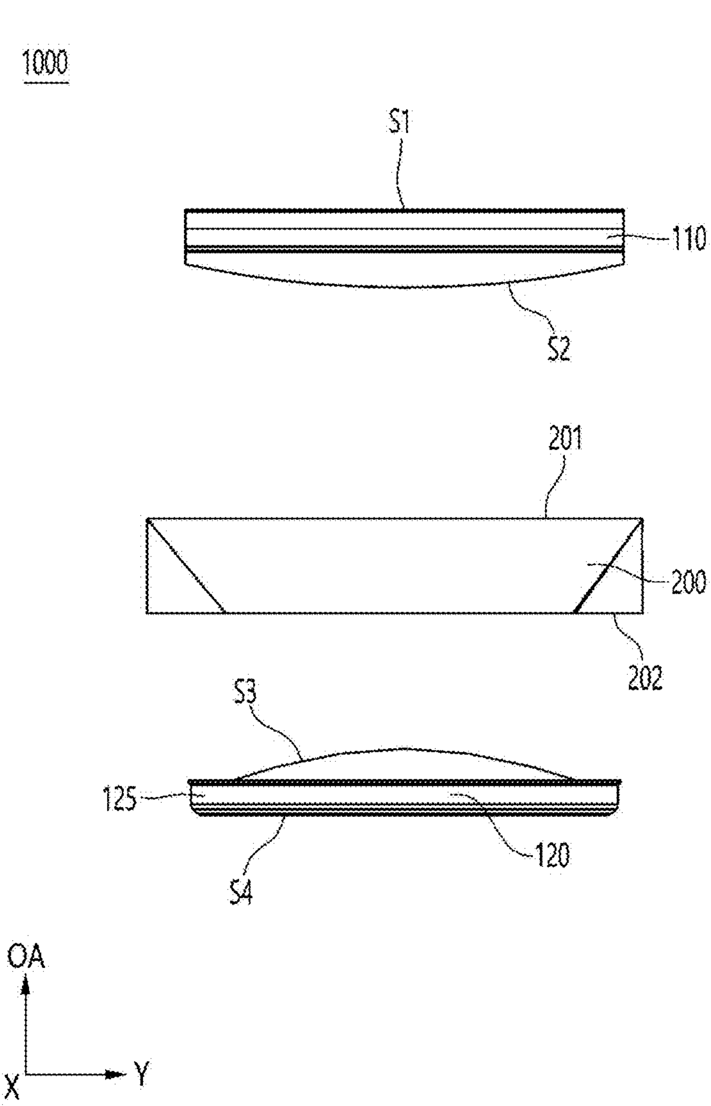
Figures 4A, 4B:
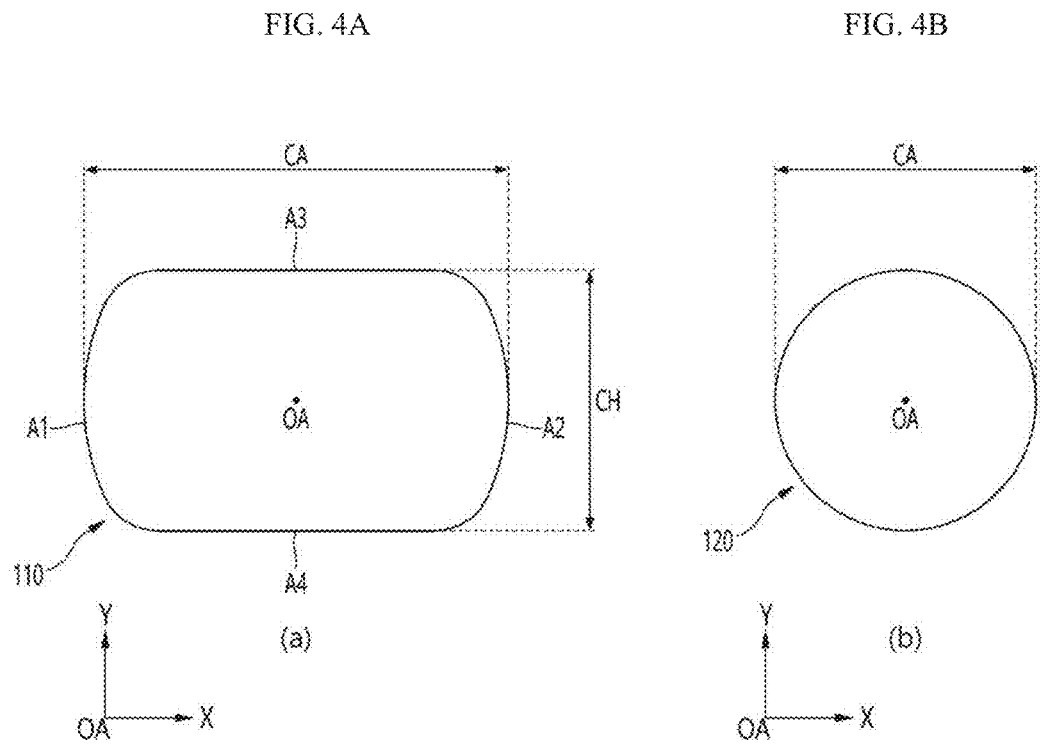

FIG. 1 is a perspective view of a camera module according to an embodiment, FIGS. 2 and 3 are side views of a camera module according to an embodiment, and FIG. 4 is a plan view of a lens of the camera module according to an embodiment.

Referring to FIGS. 1 to 4, a camera module 1000 according to an embodiment may include a plurality of lenses and a lens spacer 200. The plurality of lenses may include a first lens 110 and a second lens 120 sequentially disposed along the optical axis OA from the object side toward the image side. Each of the first lens 110 and the second lens 120 may include an object-side surface and an image-side surface. For example, the first lens 110 may include a first surface S1 defined as an object-side surface and may include a second surface S2 defined as an image-side surface. In addition, the second lens 120 may include a third surface S3 defined as an object-side surface and may include a fourth surface S4 defined as an image-side surface. Each of the first to fourth surfaces S1, S2, S3, and S4 may be provided in a convex or concave shape.

Light corresponding to object information may pass through the first lens 110 and the second lens 120 and be incident to an image sensor (not shown). Each of the first lens 110 and the second lens 120 may include an effective region. The effective region may be a region through which light incident to each of the first lens 110 and the second lens 120 passes. That is, the effective region of each of the first lens 110 and the second lens 120 may be a region where the incident light implements optical characteristics. Each of the first lens 110 and the second lens 120 may include an ineffective region. In detail, the first lens 110 may include a first ineffective region 115 defined as an ineffective region, and the second lens 120 may include a second ineffective region 125 defined as an ineffective region. The first ineffective region 115 and the second ineffective region 125 may be regions to which no light is incident. That is, the first ineffective region 115 and the second ineffective region 125 may be regions unrelated to optical characteristics. The first ineffective region 115 and the second ineffective region 125 may be regions fixed to a lens barrel (not shown) accommodating the first lens 110 and the second lens 120. Also, the first ineffective region 115 and the second ineffective region 125 may correspond to the lens spacer 200.

The first lens 110 and the second lens 120 may have circular or non-circular shapes. The first lens 110 and the second lens 120 may have different shapes. For example, the first lens 110 may have a non-circular shape. In detail, when the first lens 110 is viewed from a plane corresponding to the optical axis OA, the effective region of the first lens 110 may have a non-circular shape. The effective region of the first lens 110 may include first to fourth edges A1, A2, A3, and A4. The first edge A1 and the second edge A2 may be edges facing each other in a first direction (x-axis direction) perpendicular to the optical axis OA. The first edge A1 and the second edge A2 may have a curved shape. Also, the third edge A3 and the fourth edge A4 may be edges facing each other in a second direction (y-axis direction) perpendicular to the optical axis OA and the first direction. The third edge A3 and the fourth edge A4 may be edges connecting one-side ends of the first edge A1 and the second edge A2. The third edge A3 and the fourth edge A4 may have a straight-line shape. That is, the first lens 110 may have a D-cut shape as a non-circular lens.

The first lens 110 may have a non-circular shape in the process of being manufactured. For example, when the first lens 110 includes a plastic material, it may be manufactured in a non-circular shape during an injection process. Alternatively, the first lens 110 may be manufactured in a circular shape through an injection process, and may have the above-described third edge A3 and fourth edge A4 by cutting a partial region of the lens in a subsequent cutting process. Accordingly, the effective region of the first lens 110 may have a set size. For example, a length CA of a virtual first straight-line passing through the optical axis OA and connecting the first edge A1 and the second edge A2 may be longer than a length CH of a virtual second straight-line passing the optical axis OA and connecting the third edge A3 and the fourth edge A4. Here, the length CA of the first straight-line may mean a maximum clear aperture CA of an effective aperture of the first lens 110, and the length CH of the second straight-line may mean a minimum clear height CH of an effective aperture of the first lens 110.

The second lens 120 may have a circular shape. In detail, when the second lens 120 is viewed from a plane corresponding to the optical axis OA, an effective region of the second lens 120 may have a circular shape. Accordingly, the effective region of the second lens 120 may have a set size. For example, the second lens 120 may have a size of a constant clear aperture (effective diameter) CA as it has a circular shape. Although not shown in the drawing, the third edge A3 and the fourth edge A4 of the first lens 110 may be provided in a curved shape rather than a straight-line shape. In this case, the third edge A3 and the fourth edge A4 may have a smaller curvature than that of the first edge A1 and the second edge A2, and the first lens 110 may have a non-circular shape.

The lens spacer 200 may be disposed within the lens barrel (not shown). The lens spacer 200 may be disposed between the first lens 110 and the second lens 120. In detail, the lens spacer 200 may be disposed between the image-side surface (second surface S2) of the first lens 110 and the object-side surface (third surface S3) of the second lens 120. The lens spacer 200 may include a metal or resin material. For example, the lens spacer 200 may include at least one of aluminum (Al), copper (Cu), silver (Ag), gold (Au), chromium (Cr), nickel (Ni), zinc (Zn), tungsten (W), Tin (Sn), manganese (Mn), magnesium (Mg), zirconium (Zr), indium (In), gallium (Ga), lead (Pb), iron (Fe), molybdenum (Mo), titanium (Ti) and alloys thereof. In addition, the lens spacer 200 may include at least one resin of PE (Polyethylene), PET (Polyethylene terephthalate), PS (Polystyrene), PI (Polyimide), PEN (Polyethylene naphthalate), PC (Poly carbonate), PMI (Polymethacrylimide), PP (Polypropylene), PVC (polyvinyl chloride), PDMS (polydimethylsiloxane), and PTFE (polytetrafluoroethylene).

The lens spacer 200 may include an opening portion TH1. The opening portion TH1 may be a through hole through which the upper and lower surfaces 201 and 202 of the lens spacer 200 pass. The opening portion TH1 may be disposed in a region corresponding to the effective region of the first lens 110 and the second lens 120. In detail, the center of the opening portion TH1 may overlap the center of each of the first lens 110 and the second lens 120 in the direction of the optical axis OA. In more detail, the center of the opening portion TH1 may overlap the optical axis OA. The opening portion TH1 may provide a path for light incident to the camera module 1000. The lens spacer 200 may have a shape corresponding to the first lens 110 and the second lens 120. For example, the upper shape of the opening portion TH1 of the lens spacer 200 may have a shape corresponding to that of the first lens 110 disposed thereon, and the lower shape of the opening portion TH1 may have a shape corresponding to that of the second lens 120 disposed thereunder.

The lens spacer 200 may contact the first lens 110 and the second lens 120. For example, the upper surface 201 of the lens spacer 200 on which the opening portion TH1 is not formed may contact the first lens 110. In detail, the upper surface 201 of the lens spacer 200 may contact the ineffective region of the upper surface (second surface S2) of the first lens 110. In addition, the lower surface 202 of the lens spacer 200 in which the opening portion TH1 is not formed may contact the second lens 120. In detail, the lower surface 202 of the lens spacer 200 may contact an ineffective region of the object-side surface (third surface S3) of the second lens 120. The lens spacer 200 may maintain a constant distance between the first lens 110 and the second lens 120. In detail, the lens spacer 200 may be disposed with a predetermined thickness between the first lens 110 and the second lens 120, so that the first lens 110 and the second lens 120 may have a set interval. In addition, the lens spacer 200 may be disposed in a region corresponding to an ineffective region of the first lens 110 and the second lens 120 to block light from passing through the ineffective region.

Figure 5:
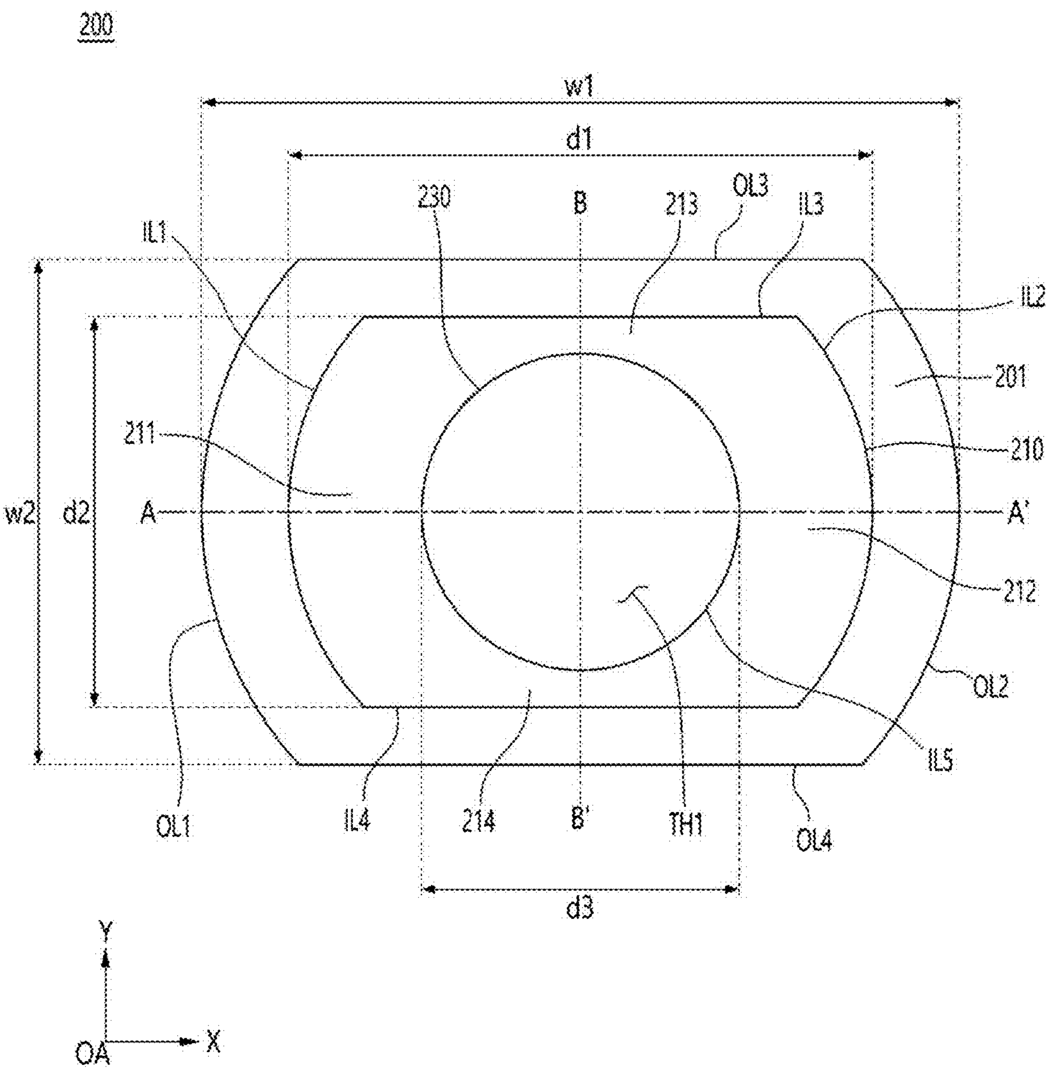
FIG. 5 is a plan view of a lens spacer of a camera module according to an embodiment.
Figure 6A:
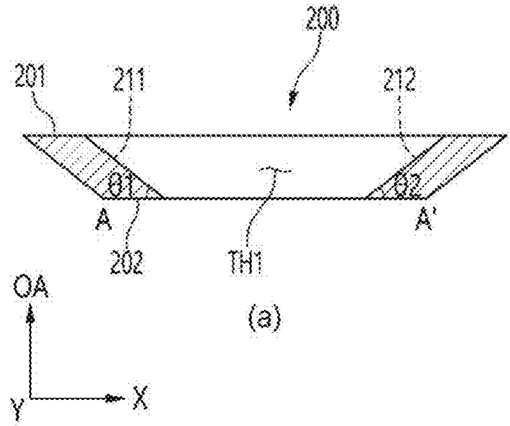
FIG. 6 is a cross-sectional side view of a lens spacer of a camera module according to an embodiment.
Figure 6B:
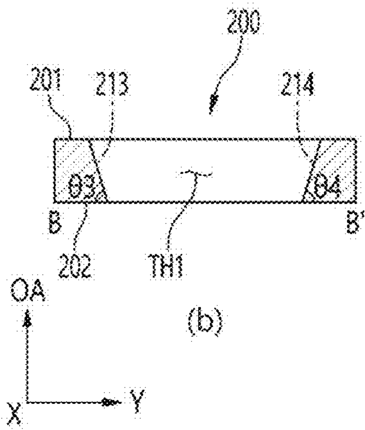

FIG. 5 is a plan view of a lens spacer of a camera module according to an embodiment, and FIG. 6 is a cross-sectional side view of a lens spacer of a camera module according to an embodiment. The lens spacer 200 according to the embodiment will be described in more detail with reference to FIGS. 5 and 6.

Referring to FIGS. 5 and 6, the upper surface 201 of the lens spacer 200 may have a set planar shape. For example, the upper surface 201 of the lens spacer 200 may have a non-circular shape. The upper surface 201 of the lens spacer 200 may include first to fourth outer peripheries OL1, OL2, OL3, and OL4. The first and second outer peripheries OL1 and OL2 may be outer peripheries facing in the first direction. The first and second outer peripheries OL1 and OL2 may have a curved shape. In addition, the third and fourth outer peripheries OL3 and OL4 are disposed between the first and second outer peripheries OL1 and OL2 and may be the sides connecting the first and second outer peripheries OL1 and OL2. The third and fourth outer peripheries OL3 and OL4 may have a straight-line shape. The upper surface 201 of the lens spacer 200 may have a first width w1 defined as a width in a first direction (x-axis direction). The first width w1 may mean a maximum length of the first and second outer peripheries OL1 and OL2 in the first direction. Also, the upper surface 201 of the lens spacer 200 may have a second width w2 defined as a width in a second direction (y-axis direction). The second width w2 may mean a maximum length of the third and fourth outer peripheries OL3 and OL4 in the second direction. In this case, the second width w2 may be smaller than the first width w1. That is, since the upper surface 201 of the lens spacer 200 has a shape corresponding to that of the first lens 110 having a non-circular shape, widths w1 and w2 in the first and second directions may be different from each other.

The lower surface 202 of the lens spacer 200 may have a set planar shape. The lower surface 202 of the lens spacer 200 may have a circular shape. The lower surface 202 of the lens spacer 200 may have a third width (not shown). The third width may be smaller than the first width w1. In addition, the third width may not have a different length depending on the directions like the upper surface 201, but may be constant depending on the directions. In detail, the lower surface 202 of the lens spacer 200 may have a constant width because it has a shape corresponding to that of the second lens 120 having a circular shape.

The lens spacer 200 may include an opening portion TH1. The opening portion TH1 may be a through hole penetrating the upper and lower surfaces 201 and 202 of the lens spacer 200. Here, the upper surface 201 of the lens spacer 200 may be a surface facing the first lens 110, and the lower surface 202 of the lens spacer 200 may be a surface facing the second lens 120. The opening portion TH1 may have a set size. In detail, the upper region 210 of the opening portion TH1 may be provided to be larger than or equal to the size of the light receiving region of the first lens 110. For example, the size of the upper region 210 of the opening portion TH1 may be greater than or equal to the size of the effective region of the image-side surface of the first lens 110. Here, the upper region 210 of the opening portion TH1 means the uppermost region of the opening portion TH1. The lower region 230 of the opening portion TH1 may be provided to be larger than or equal to the size of the light receiving region of the second lens 120. For example, the size of the lower region of the opening portion TH1 may be greater than or equal to the size of the effective region of the object-side surface of the second lens 120. Here, the lower region 230 of the opening portion TH1 means the lowermost region of the opening portion TH1. The upper region 210 of the opening portion TH1 may have a planar shape corresponding to that of the first lens 110. The upper region 210 may have a planar shape corresponding to the image-side surface (second surface S2) of the first lens 110. In detail, the upper region 210 may have a non-circular shape corresponding to the first lens 110.

The upper region 210 of the opening portion TH1 may include first to fourth inner peripheries ILL IL2, IL3, and IL4. The first and second inner peripheries IL1 and IL2 may be inner peripheries facing in the first direction. The first and second inner peripheries IL1 and IL2 may be located in regions corresponding to the first and second edges A1 and A2 of the first lens 110, respectively. The first and second inner peripheries IL1 and IL2 may have shapes corresponding to the first and second edges A1 and A2. In detail, the first and second inner peripheries IL1 and IL2 may have a curved shape. The third and fourth inner peripheries IL3 and IL4 may be inner peripheries facing in the second direction. The third and fourth inner peripheries IL3 and IL4 are disposed between the first and second inner peripheries IL1 and IL2 and may be sides connecting the first and second inner peripheries IL1 and IL2. For example, the third inner periphery IL3 may be connected to one-side ends of the first and second inner peripheries IL1 and IL2, and the fourth inner periphery IL4 may be connected to the other-side ends of the first and second inner peripheries IL1 and IL2. The third and fourth inner peripheries IL3 and IL4 may be located in regions corresponding to the third and fourth edges A3 and A4 of the first lens 110, respectively. The third and fourth inner peripheries IL3 and IL4 may have shapes corresponding to the third and fourth edges A3 and A4. In detail, the third and fourth inner peripheries IL3 and IL4 may have a straight-line shape.

An upper region 210 of the opening portion TH1 may have a first length d1 defined as a length in a first direction. The first length d1 may mean a maximum length in the first direction between inner side surfaces of the opening portion TH1 facing in the first direction. That is, the first length d1 may mean the maximum length between the first and second inner peripheries IL1 and IL2. Also, the upper region 210 may have a second length d2 defined as a length in a second direction (y-axis direction). The second length d2 may mean a maximum length in the second direction between inner side surfaces of the opening portion TH1 facing in the second direction. That is, the second length d2 may mean a maximum length between the third and fourth inner peripheries IL3 and IL4. In this case, the second length d2 may be smaller than the first length d1. That is, since the upper region 210 of the opening portion TH1 has a shape corresponding to that of the first lens 110 having a non-circular shape, the first and second lengths d1 and d2 may be different from each other.

Although not shown in the drawing, when the third edge A3 and the fourth edge A4 of the first lens 110 are provided in a curved shape rather than a straight-line, the third and fourth inner periphery IL3 and IL4 may have a curved shape corresponding to the third and fourth edges A3 and A4. In this case, the third and fourth inner peripheries IL3 and IL4 may have smaller curvatures than the first and second inner peripheries IL1 and IL2.

A lower region 230 of the opening portion TH1 may have a planar shape corresponding to that of the second lens 120. The lower region 230 may have a planar shape corresponding to the object-side surface (third surface S3) of the second lens 120. For example, the planar shape of the lower region 230 may have a circular shape corresponding to that of the second lens 120. That is, the lower region 230 may have a shape different from that of the upper region 210. The lower region 230 of the opening portion TH1 may include a fifth inner periphery IL5. The lower region 230 may have a third length d3 defined as a horizontal width. The third length d3 is a length in a horizontal direction including the first and second directions, and may be the diameter of a circle formed by the fifth inner periphery IL5.

In this case, the third length d3 of the lens spacer 200 may be smaller than the first length d1 and the second length d2, and the first to third lengths d1, d2, and d3 may satisfy Equation 1 below.

$$0.2<(X1/Y1)-(X2/Y2)<1.9 \qquad \text{[Equation 1]}$$

In Equation 1, X1 means the maximum length of the upper region 210 of the opening portion TH1 in the first direction, and Y1 means the maximum length of the upper region 210 in the second direction. That is, X1 may mean the first length d1, and Y1 may mean the second length d2. Further, X2 means the maximum length of the lower region 230 of the opening portion TH1 in the first direction, and Y2 means the maximum length of the lower region 230 in the second direction. That is, X2 and Y2 mean the third length d3 and may be equal to each other.

In detail, the first to third lengths d1, d2, and d3 may satisfy Equation 2 below.

$$0.3<(X1/Y1)-(X2/Y2)<1.8 \quad \text{[Equation 2]}$$

In Equation 2, X1 may mean the first length d1, and Y1 may mean the second length d2. Also, X2 and Y2 mean the third length d3 and may be equal to each other.

In more detail, the first to third lengths d1, d2, and d3 may satisfy Equation 3 below.

$$0.4<(X1/Y1)-(X2/Y2)<1.7 \quad \text{[Equation 3]}$$

In Equation 3, X1 may mean the first length d1, and Y1 may mean the second length d2. Also, X2 and Y2 mean the third length d3 and may be equal to each other.

The lens spacer 200 may include a plurality of inner side surfaces. In detail, the lens spacer 200 may include a plurality of inner side surfaces exposed by the opening portion TH1. For example, the lens spacer 200 may include a first inner side surface 211 and a second inner side surface 212 facing each other in a first direction. In addition, the lens spacer 200 may include a third inner side surface 213 and a fourth inner side surface 214 facing in the second direction. The third and fourth inner side surfaces 213 and 214 may be disposed between the first and second inner side surfaces 211 and 212. The third and fourth inner side surfaces 213 and 214 may be connected to the first and second inner side surfaces 211 and 212. A distance between the first inner side surface 211 and the second inner side surface 212 may vary. For example, the distance between the first inner side surface 211 and the second inner side surface 212 on the upper region 210 of the opening portion TH1 may be the first length d1, and a distance between the first inner side surface 211 and the second inner side surface 212 on the lower region 230 may be the third length d3. A distance between the first inner side surface 211 and the second inner side surface 212 may gradually decrease from the upper region 210 to the lower region 230 of the opening portion TH1. In this case, the distance between the first inner side surface 211 and the second inner side surface 212 may decrease linearly. A distance between the third inner side surface 213 and the fourth inner side surface 214 may vary. For example, the distance between the third inner side surface 213 and the fourth inner side surface 214 on the upper region 210 of the opening portion TH1 may be the second length d2, and a distance between the third inner side surface 213 and the fourth inner side surface 214 on the lower region may be the third length d3. A distance between the third inner side surface 213 and the fourth inner side surface 214 may gradually decrease from the upper region 210 to the lower region 230 of the opening portion TH1. In this case, the distance between the third inner side surface 213 and the fourth inner side surface 214 may decrease linearly.

In detail, the distance between the inner side surfaces facing each other in the first to fourth inner side surfaces 211, 212, 213, and 214 may be changed as described above by the inclination angle of the first to fourth inner side surfaces 211, 212, 213, 214 with respect to the lower surface 202 of the lens spacer 200. For example, the first inner side surface 211 may have a first inclination angle θ1 with respect to the lower surface 202 of the lens spacer 200, and the second inner side surface 212 may have second inclination angle θ2 with respect to the lower surface 202 of the lens spacer 200. The first inclination angle θ1 and the second inclination angle θ2 may be between about 25 degrees and about 90 degrees. In detail, the first inclination angle θ1 and the second inclination angle θ2 may be about 30 degrees to about 88 degrees. In more detail, the first inclination angle θ1 and the second inclination angle θ2 may be about 32 degrees to about 85 degrees. When the first inclination angle θ1 and the second inclination angle θ2 do not satisfy the above-mentioned ranges, Loss of light moving from the first lens 110 toward the second lens 120 through the opening portion TH1 may occur. In detail, some of the light passing through the first lens 110 may be provided to the first inner side surface 211 and the second inner side surface 212 to cause light loss. Therefore, it is preferable that the first and second inclination angles θ1 and 02 satisfy the aforementioned range. The first inclination angle θ1 and the second inclination angle θ2 may be equal to each other within the aforementioned range.

In addition, the third inner side surface 213 may have a third inclination angle θ3 with respect to the lower surface 202 of the lens spacer 200, and the fourth inner side surface 214 may have a fourth inclination angle θ4 with respect to the lower surface 202 of the lens spacer 200. The third inclination angle θ3 and the fourth inclination angle θ4 may be between about 50 degrees and about 90 degrees. In detail, the third inclination angle θ3 and the fourth inclination angle θ4 may be about 55 degrees to about 90 degrees. In more detail, the third inclination angle θ3 and the fourth inclination angle θ4 may be about 60 degrees to about 90 degrees. When the third and fourth inclination angles θ3 and 04 do not satisfy the aforementioned ranges, Loss of light moving from the first lens 110 toward the second lens 120 through the opening portion TH1 may occur. In detail, some of the light passing through the first lens 110 may be provided to the third inner side surface 213 and the fourth inner side surface 214 to cause light loss. Therefore, it is preferable that the third and fourth inclination angles θ3 and 04 satisfy the aforementioned range. The third inclination angle θ3 and the fourth inclination angle θ4 may be equal to each other within the aforementioned range. Also, the third inclination angle θ3 and the fourth inclination angle θ4 may be greater than the first inclination angle θ1 and the second inclination angle θ2 within the above-described range.

Therefore, according to an embodiment of the invention, the lens spacer 200 may have a shape in which the upper region 210 and the lower region 230 of the opening portion TH1 are different from each other by controlling the angles θ1, 02, 03, and 04 of the inner side surfaces 211, 212, 213, and 214, and the distances between the inner side surfaces 211, 212, 213 and 214 facing each other exposed by the opening portion TH1.

In detail, in the case of the conventional lens spacer 200, the upper region 210 and the lower region 230 of the opening portion TH1 may have shapes corresponding to each other. For example, when the upper region 210 of the opening portion TH1 has a circular shape, the lower region 230 also has a circular shape, and when the upper region 210 has a non-circular shape, the lower region 230 also has a non-circular shape. For example, when the first lens 110 has a D-cut shape with a non-circular shape as described above, the upper region 210 of the opening portion TH1 of the lens spacer 200 may have a D-cut shape, and the lower region 230 of the opening portion TH1 may be formed in a D-cut shape. Accordingly, the object-side surface (third surface S3) of the second lens 120 is formed to have a D-cut shape corresponding to the lower region 230 of the opening portion TH1, and the light incident to the second lens 120 was partially lost due to the shape of the third surface S3.

However, in the lens spacer 200 according to an embodiment of the invention, the upper region 210 and the lower region 230 of the opening portion TH1 may have different shapes. In detail, the upper region 210 of the opening portion TH1 may have a non-circular shape corresponding to the first lens 110, for example, a D-cut shape, and the lower region 230 of the opening portion TH1 may have a circular shape corresponding to the second lens 120. In more detail, the upper region 210 may have a non-circular shape corresponding to the image-side surface (second surface S2) of the first lens 110 having a D-cut shape, and the lower region 230 may have a circular shape corresponding to the object-side surface (third surface S3) of the second lens 120 having a circular shape. Accordingly, the lens spacer 200 may allow the two lenses 110 and 120 to have a set distance between the lenses 110 and 120 having different shapes, including at least one non-circular lens, thereby reducing the total thickness of the camera module 100 compared to a camera module including only circular lenses. In addition, in the camera module 1000 according to the embodiment, as the upper region 210 and the lower region 230 of the opening portion TH1 have different shapes, the number of non-circular lenses, in detail, the number of the lens surface having the non-circular shape may be minimized, and light loss caused by the non-circular lens may be minimized. Accordingly, the camera module 1000 according to the embodiment may have improved optical characteristics.

Features, structures, effects, etc. described in the embodiments above are included in at least one embodiment of the invention, and are not necessarily limited to only one embodiment. Furthermore, the features, structures, and effects illustrated in each embodiment can be combined or modified with respect to other embodiments by those skilled in the art in the field to which the embodiments belong. Therefore, contents related to these combinations and variations should be construed as being included in the scope of the invention.

Although described based on the embodiments, this is only an example, this invention is not limited, and it will be apparent to those skilled in the art that various modifications and applications not illustrated above are possible without departing from the essential characteristics of this embodiment. For example, each component specifically shown in the embodiment can be modified and implemented. And the differences related to these modifications and applications should be construed as being included in the scope of the invention as defined in the appended claims.

The invention claimed is:

1. A camera module comprising:

a lens barrel; and a lens spacer disposed within the lens barrel, wherein the lens spacer comprises:

an opening portion penetrating upper and lower surfaces thereof, wherein a shape of an upper region of the opening portion is different from a shape of a lower region of the opening portion, wherein the upper region of the opening portion comprises:

a first inner periphery having a curved shape;

a second inner periphery facing the first inner periphery in a first direction and having a curved shape, a third inner periphery connecting one-side ends of the first and second inner peripheries and having a straight-line shape, and a fourth inner periphery connecting other-side ends of the first and second inner peripheries, which are opposite to the one-side ends thereof, having a straight-line shape, and facing the third inner periphery in a second direction, wherein the lower region of the opening portion has a circular shape, wherein the lower and upper surfaces of the lens spacer have different shapes, wherein the upper region of the opening portion has a first length defined by a maximum length X1 in the first direction and a second length defined by a maximum length Y1 in the second direction perpendicular to the first direction, wherein the lower region of the opening portion includes a third length defined by maximum lengths X2 and Y2 in the first and second directions, wherein the third length is smaller than the first and second lengths, wherein the first and second directions are perpendicular to an optical axis, and wherein the upper and lower regions of the opening portion satisfy the following Equation:

$$0.2<(X1/Y1)-(X2/Y2)<1.9.$$

2. The camera module of claim 1, wherein the upper and lower regions of the opening portion satisfy the following Equation:

$$0.4<(X1/Y1)-(X2/Y2)<1.7.$$

3. The camera module of claim 1, wherein the lens spacer comprises at least one inner side surface exposed by the opening portion, wherein the inner side surface comprises:

a first inner side surface;

a second inner side surface facing the first inner side surface in the first direction;

a third inner side surface disposed between the first and second inner side surfaces; and a fourth inner side surface disposed between the first and second inner side surfaces and facing in the second direction perpendicular to the first direction.

4. The camera module of claim 3, wherein the first inner side surface has a first inclination angle with respect to the lower surface, wherein the second inner side surface has a second inclination angle with respect to the lower surface, and wherein the first inclination angle is equal to the second inclination angle.

5. The camera module of claim 4, wherein the third inner side surface has a third inclination angle with respect to the lower surface, wherein the fourth inner side surface has a fourth inclination angle with respect to the lower surface, wherein the third inclination angle is equal to the fourth inclination angle.

6. The camera module of claim 5, wherein the first and second inclination angles are smaller than the third and fourth inclination angles.

7. A camera module comprising:

a first lens and a second lens sequentially disposed along an optical axis from an object side toward an image side; and a lens spacer disposed between the first and second lenses, wherein the first and second lenses have different shapes, wherein the lens spacer includes an opening portion penetrating an upper surface and a lower surface thereof, wherein a shape of an upper region of the opening portion is different from a shape of a lower region of the opening portion, wherein the lower and upper surfaces of the lens spacer have different shapes, wherein the upper region of the opening portion faces an image-side surface of the first lens, wherein the lower region of the opening portion faces an object-side surface of the second lens, wherein the upper and lower regions of the opening portion satisfy the following Equation:

$$0.2<(X1/Y1)-(X2/Y2)<1.9$$

where, X1 means a maximum length of the upper region of the opening portion in a first direction, Y1 means a maximum length of the upper region of the opening portion in a second direction perpendicular to the first direction, X2 means a maximum length of the lower region of the opening portion in the first direction, Y2 means a maximum length of the lower region of the opening portion in the second direction, and the first and second directions are perpendicular to the optical axis.

8. The camera module of claim 7, wherein the first lens has a D-cut shape, and wherein the second lens has a circular shape.

9. The camera module of claim 8, wherein the upper region of the opening portion has a shape corresponding to that of the first lens, wherein the lower region of the opening portion has a shape corresponding to that of the second lens, wherein the upper region of the opening portion has a first length defined by the maximum length in the first direction and a second length defined by the maximum length in the second direction, wherein the maximum lengths of the lower region of the opening portion in the first and second directions are equal to each other, wherein the lower region of the opening portion includes a third length defined by the maximum lengths in the first and second directions, and wherein the third length is smaller than the first and second lengths.

10. The camera module of claim 7, wherein the first lens has a non-circular shape, wherein the second lens has a circular shape, and wherein the lens spacer is disposed between the image-side surface of the first lens and the object-side surface of the second lens.

11. The camera module of claim 10, wherein the upper surface of the lens spacer has a non-circular shape, and wherein the lower surface of the lens spacer has a circular shape.

12. The camera module of claim 7, wherein the first lens has a non-circular shape, wherein the second lens has a circular shape, wherein the upper surface of the lens spacer is in contact with an ineffective region of the image-side surface of the first lens, and the lower surface of the lens spacer is in contact with an ineffective region of the object-side surface of the second lens.

13. The camera module of claim 7, wherein the first lens has a non-circular shape, wherein the second lens has a circular shape, and wherein the lens spacer maintains a distance between the first lens and the second lens.

14. The camera module of claim 7, wherein the lens spacer includes a metal or resin material.

15. The camera module of claim 7, wherein an upper shape of the opening portion of the lens spacer is a non-circular shape, wherein a lower shape of the opening portion of the lens spacers is a circular shape, wherein the lens spacer has the upper surface of a non-circular shape and the lower surface of a circular shape, wherein the upper surface of the lens spacer is in contact with an ineffective region of the image-side surface of the first lens, and wherein the lower surface of the lens spacer is in contact with an ineffective region of the object-side surface of the second lens.

16. A camera module comprising:

a lens spacer disposed between first and second lenses sequentially disposed along an optical axis, wherein upper and lower surfaces of the lens spacer are disposed between an image-side surface of the first lens and an object-side surface of the second lens, wherein the upper surface of the lens spacer has a non-circular shape, wherein the lower surface of the lens spacer has a circular shape, wherein the lens spacer includes an opening portion penetrating from the upper surface to the lower surface thereof, wherein the upper surface of the opening portion has a non-circular shape, and wherein the lower surface of the opening portion has a circular shape, wherein upper and lower regions of the opening portion satisfy the following Equation:

$$0.2<(X1/Y1)-(X2/Y2)<1.9$$

where, X1 means a maximum length of the upper region of the opening portion in a first direction, Y1 means a maximum length of the upper region of the opening portion in a second direction perpendicular to the first direction, X2 means a maximum length of the lower region of the opening portion in the first direction, Y2 means a maximum length of the lower region of the opening portion in the second direction, and the first and second directions are perpendicular to the optical axis.

17. The camera module of claim 16, wherein an area of the upper surface of the opening portion is larger than an area of the lower surface of the opening portion.

18. The camera module of claim 16, wherein the image-side surface of the first lens has different lengths in first and second directions orthogonal to each other and passing through an optical axis, and wherein the object-side surface of the second lens has the same lengths in the first and second directions passing through the optical axis.

19. The camera module of claim 16, wherein a length of the object-side surface of the second lens in the first and second directions is smaller than a length of the image-side surface of the first lens in the first direction.

20. The camera module of claim 16, wherein the opening portion includes a plurality of inner side surfaces, wherein the plurality of inner side surfaces includes a first inner side surface; a second inner side surface facing the first inner surface in a first direction; a third side inner surface disposed between the first and second inner side surfaces; and a fourth inner side surface disposed between the first and second inner side surfaces and facing in a second direction perpendicular to the first direction, wherein the first inner side surface has a first inclination angle with respect to the lower surface of the lens spacer, wherein the second inner side surface has a second inclination angle with respect to the lower surface of the lens spacer, wherein the first inclination angle is the same as the second inclination angle, wherein the third inner side surface has a third inclination angle with respect to the lower surface of the lens spacer, wherein the fourth inner side surface has a fourth inclination angle with respect to the lower surface of the lens spacer, wherein the third inclination angle is the same as the fourth inclination angle, and wherein the first and second inclination angles are smaller than the third and fourth inclination angles.

* * * * *